United States Patent
Bruno

(10) Patent No.: US 11,133,924 B2
(45) Date of Patent: *Sep. 28, 2021

(54) PROCESS EFFICIENT PREPROCESSING FOR ANY ENCRYPTION STANDARD

(71) Applicant: McAfee, LLC, Santa Clara, CA (US)

(72) Inventor: Richard Bruno, St. Albans, VT (US)

(73) Assignee: McAfee, LLC, San Jose, CA (US)

(*) Notice: Subject to any disclaimer, the term of this patent is extended or adjusted under 35 U.S.C. 154(b) by 55 days.

This patent is subject to a terminal disclaimer.

(21) Appl. No.: 16/779,414

(22) Filed: Jan. 31, 2020

(65) Prior Publication Data

US 2020/0177367 A1  Jun. 4, 2020

Related U.S. Application Data

(63) Continuation of application No. 16/388,583, filed on Apr. 18, 2019, now Pat. No. 10,567,164, which is a
(Continued)

(51) Int. Cl.
*H04L 9/06* (2006.01)
*G06F 21/62* (2013.01)
*G06F 21/60* (2013.01)

(52) U.S. Cl.
CPC ............ *H04L 9/065* (2013.01); *G06F 21/602* (2013.01); *G06F 21/62* (2013.01); *H04L 9/0637* (2013.01);
(Continued)

(58) Field of Classification Search
CPC ... H04L 9/065; H04L 9/0637; H04L 2209/04; H04L 2209/34; G06F 21/602; G06F 21/62
(Continued)

(56) References Cited

U.S. PATENT DOCUMENTS 5,479,512 A   12/1995 Weiss
5,483,598 A *  1/1996 Kaufman .............. H04L 9/0662
                                                   380/43
(Continued)

FOREIGN PATENT DOCUMENTS

EP   2408114 A2    1/2012
WO   2012172115 A1  12/2012
WO   2013050612 A1   4/2013

OTHER PUBLICATIONS

International Searching Authority, "International Search Report," dated Sep. 15, 2014, in connection with International Patent Application No. PCT/CA2013/050969, 4 pages.
(Continued)

*Primary Examiner* — Badri Narayanan Champakesan
(74) *Attorney, Agent, or Firm* — Hanley, Flight & Zimmerman, LLC

(57) ABSTRACT

Disclosed examples decrypt a first block of sequential blocks using a first decryption key generated based on a first hash of a second decryption key and bit stream data, the first decryption key associated with the first block of the sequential blocks to generate a first segment of a band entropy coded bit stream; generate a third decryption key for a second block of the sequential blocks based on a second hash of the first decryption key and data of the first block of the sequential blocks; decrypt the second block of the sequential blocks using the third decryption key associated with the second block of the sequential blocks to generate a second segment of the band entropy coded bit stream; and merge the first and second segments of the band entropy coded bit stream to generate a source data bit stream using a bit mask for demultiplexing.

18 Claims, 4 Drawing Sheets

Related U.S. Application Data continuation of application No. 15/026,854, filed as application No. PCT/CA2013/050969 on Dec. 16, 2013, now Pat. No. 10,270,590.

(52) U.S. Cl.
CPC ...... *H04L 2209/04* (2013.01); *H04L 2209/34* (2013.01)

(58) Field of Classification Search
USPC .......................................................... 380/28
See application file for complete search history.

(56) References Cited

U.S. PATENT DOCUMENTS

| | | | | |
|---|---|---|---|---|
| 6,300,888 B1* | 10/2001 | Chen | ................ | G11B 20/1426 341/63 |
| 8,020,065 B1* | 9/2011 | Gaur | .................... | H03M 13/25 714/755 |
| 8,487,791 B2* | 7/2013 | Korodi | ................... | H04N 19/46 341/107 |
| 8,810,439 B1* | 8/2014 | Kalevo | ............... | H03M 7/3079 341/76 |
| 10,270,590 B2 | 4/2019 | Bruno | | |
| 10,567,164 B2 | 2/2020 | Bruno | | |
| 2005/0207569 A1* | 9/2005 | Zhang | .............. | H04N 21/23476 380/28 |
| 2006/0171463 A1* | 8/2006 | Hanamura | ............. | H04N 19/40 375/240.13 |
| 2006/0195787 A1* | 8/2006 | Topiwala | ......... | H04N 21/41407 715/700 |
| 2009/0034715 A1* | 2/2009 | Ramasamy | ........... | H04L 9/0637 380/28 |
| 2009/0080647 A1* | 3/2009 | Mantin | ................. | H04L 9/0625 380/29 |
| 2009/0091481 A1* | 4/2009 | Pang | ....................... | H03M 7/42 341/106 |
| 2009/0164783 A1* | 6/2009 | Solis | ..................... | H04L 9/3236 713/168 |
| 2011/0033045 A1* | 2/2011 | Bancel | .................. | G06F 21/755 380/44 |
| 2011/0126084 A1* | 5/2011 | Serret-Avila | .......... | H04L 9/3236 714/807 |
| 2011/0150351 A1* | 6/2011 | Singh | .................... | H04N 19/91 382/234 |
| 2011/0225322 A1* | 9/2011 | Demidov | ............ | H03M 7/6088 709/247 |
| 2012/0128068 A1* | 5/2012 | Thoreau | ............... | H04N 19/137 375/240.12 |
| 2013/0117270 A1* | 5/2013 | Sullivan | ................ | G06F 16/285 707/740 |
| 2013/0219008 A1* | 8/2013 | Zhou | ................... | H04L 67/2842 709/216 |
| 2014/0210652 A1* | 7/2014 | Bartnik | ................ | H04N 19/436 341/67 |
| 2015/0208095 A1* | 7/2015 | Schierl | ............... | H04N 21/4728 375/240.28 |
| 2016/0156935 A1* | 6/2016 | Suehring | ................ | H04N 19/85 375/240.27 |
| 2016/0204942 A1* | 7/2016 | Bohli | ...................... | G06F 21/64 713/168 |
| 2017/0180733 A1* | 6/2017 | George | ................... | H04N 19/50 |
| 2018/0084267 A1* | 3/2018 | George | ................ | H04N 19/167 |
| 2019/0253236 A1 | 8/2019 | Bruno | | |

OTHER PUBLICATIONS

International Searching Authority, "Written Opinion," dated Sep. 15, 2014, in connection with International Patent Application No. PCT/CA2013/050969, 5 pages.

European Patent Office, "Supplementary Partial European Search Report," dated Jul. 10, 2017, in connection with European Patent Application No. 13899515.4, 10 pages.

European Patent Office, "Extended European Search Report," dated Oct. 30, 2017, in connection with European Patent Application No. 13899515.4, 11 pages.

United States Patent and Trademark Office, "Non-Final Office Action," dated Sep. 27, 2017, in connection with U.S. Appl. No. 15/026,854, 25 pages.

United States Patent and Trademark Office, "Final Office Action," dated Apr. 19, 2018, in connection with U.S. Appl. No. 15/026,854, 21 pages.

United States Patent and Trademark Office, "Notice of Allowance," dated Dec. 11, 2018, in connection with U.S. Appl. No. 15/026,854, 15 pages.

Bruce Schneier, "Applied Cryptography, Second Edition: Protocols, Algorthms, and SourceCode in C," John Wiley & Sons, Inc., ISBN: 0471128457, published Jan. 1, 1996, p. 180 (1 page).

United States Patent and Trademark Office, "Notice of Allowance," dated Sep. 19, 2019, in connection with U.S. Appl. No. 16/388,583, 13 pages.

United States Patent and Trademark Office, "Advisory Action," dated Jul. 12, 2018, in connection with U.S. Appl. No. 15/026,854, 4 pages.

\* cited by examiner

PROCESS EFFICIENT PREPROCESSING FOR ANY ENCRYPTION STANDARD

CROSS REFERENCE TO RELATED APPLICATIONS

This Patent arises from a continuation of U.S. patent application Ser. No. 16/388,583, filed on Apr. 18, 2019, which is a continuation of U.S. patent application Ser. No. 15/026,854, filed on Apr. 1, 2016, now U.S. Pat. No. 10,270,590, which is a U.S. National Stage Patent Application under 35 U.S.C. 371 of PCT Patent Application No. PCT/CA2013/050969, entitled "Process Efficient Preprocessing for any Encryption Standard," and filed Dec. 16, 2013, all of which are hereby incorporated herein by reference in their entireties.

FIELD

The present invention generally relates to methods and processes to enhance the value of any encryption standard for securing data as well as securely communicating any data. More particularly, it relates to an overall method of encryption and decryption based on any existing encryption standard such that the encoding and decoding process, as well as the resulting cipher text bit stream, is made more robust.

BACKGROUND

Encryption has become, amongst others, an integral part of digital transaction systems, secure digital communications, anonymous data storage and digital vault systems. Many encryption standards, de jure and de facto, are in use today and more are to come. Some of these standards use asymmetric encryption requiring two keys, a public key and a private key, whilst others use symmetric encryption requiring one key. In this latter case the encryption key needs to be securely shared between a digital information source (the "Sender") and the digital information destination (the "Receiver").

While encryption standards use a variety of algorithms they have also, in the past, been enhanced by such processes as entropy coding, on the one hand, and changing encryption (crypto-) keys during the encoding process of one file, on the other hand. In the former case of preprocessing via entropy coding before encryption, many existing entropy encoding standards, de jure and de facto, have been or can be used. For the latter case, there are examples of using an initial crypto key plus data from the file's bit stream to create a new crypto key, for example via a hash, for the encoding of the next sample of the file's bit stream.

The problem with most of these approaches is that they do not increase encoding and decoding complexity sufficiently to thwart an attack against a weakened encryption algorithm whether with or without the use of entropy coding. Although it is easy to add complexity and computational intensity to an encryption process it is more difficult to add complexity whilst roughly retaining computational intensity.

Various encryption solutions exist in the prior art yet there has been no solution proposed that adds complexity to an encryption process (rendering the encryption process more secure) while maintaining the system resources required to operate the encryption process in a disproportionate manner.

U.S. Pat. No. 8,127,135 to Ibrahim et al. discloses methods and systems where a first operating system and a second operating system share encrypted information using a first shared key. After a predetermined number of encrypted communications using the first shared key, the two operating systems cooperate to share encrypted communications with a second shared key in order to change the first shared key. Once the first shared key is changed the second shared key is also changed.

U.S. Pat. No. 8,284,945 to Breyel discloses methods and systems where a first encryption key is changed once a volume of data encrypted with that first key exceeds a predetermined threshold, this threshold determined by a particular formula derived to automatically change the key in response to the number of changes that have occurred in view of the amount of encrypted data being transmitted.

U.S. Pat. No. 8,369,525 to Jordan et al. discloses methods and systems for dynamically changing encryption keys wherein a new encryption key is sent in a message having a password key indicator randomly placed in the message text and encrypted with a previous encryption key, and the new encryption key is retrieved from the encrypted message based on the location of the password key indicator.

U.S. Pat. No. 8,487,791 to Korodi et al. discloses methods and systems for entropy encoding and decoding data using parallel coders to encode an overall input sequence as multiple subsequences, which are eventually combined to form an output bit stream. A context model is provided to separate the input sequence into multiple subsequences. Multiple encoded subsequences are extracted from the output bit stream and decoded in parallel to generate a plurality of decoded subsequences which are in turn interleaved to create a reconstructed sequence.

U.S. Pat. No. 8,509,555 to Meany discloses methods and systems for error-resilient entropy coding where a plurality of code words are generated that are representative of data to be encoded. The code words can be generated with first and second portions, with each first portion including information that is representative of predetermined characteristic of an associated second portion, and the second portion associated with a portion of the data to be encoded.

U.S. Pat. No. 8,514,943 to Lee et al. discloses methods and systems for enhancing the performance of entropy coding by coding a first coefficient without loss, which includes obtaining a distribution of a second coefficient included in an area of a base layer corresponding to a block of a predetermined layer among coefficients generating when coding data, selecting a suitable lookup table, and transforming the first coefficient into a value mapped on to the selected lookup table.

U.S. Publication No. 2002/0025040 to Stein discloses methods and apparatus for generating an encryption key, where a randomly ordered sequence of bytes is retrieved from memory and each byte in the sequence is assigned to a number of groups, where the number of the groups is defined by the number of bytes in the encryption key. Each group is then in turn reduced to a single byte to generate one of the resultant bytes of the encryption key.

Therefore, there is need for a more thwart-proof method and system for bit stream pre-processing before encryption which adds complexity without significantly adding to computational complexity.

This background information is provided to reveal information believed by the applicant to be of possible relevance to the present invention. No admission is necessarily intended, nor should be construed, that any of the preceding information constitutes prior art against the present invention.

BRIEF SUMMARY

In at least one embodiment the present invention provides a method of creating at least two band entropy coded bit streams from a Source Data bit stream, the method having the steps of separating the Source Data bit stream into at least two bit streams, each of the at least two bit streams associated with an entropy band having a predetermined entropy designation, the predetermined entropy designation selected from an entropy designation range between a predetermined high entropy designation and a predetermined low entropy designation, entropy coding each of the at least two bit streams separately and in parallel using a standard entropy coder to create at least two band entropy coded bit streams, generating a bit mask with a hash, the hash having inputs of at least a predetermined strong encryption key and selected data from the Source Data bit stream, and merging each of the at least two band entropy coded bit streams into a resultant band entropy coded bit stream based on a sequence of indexed values obtained from the bit mask, the sequence of indexed values proceeding in steps from a first index value of the bit mask to a last index value of the bit mask and repeating from the first index value, the steps of a step size such that the minimum step size is one bit and the maximum step size is the width of the indexed values in bits, the indexed values obtained from the bit mask being associated with one of the at least two band entropy coded bit streams to be merged.

In another embodiment the present invention provides a method of encoding sequential blocks, each of the sequential blocks being associated with a unique encryption key, the method comprising the steps of slicing a resultant band entropy coded bit stream into a plurality of sequential blocks of a predetermined block size, generating a unique strong encryption key for a current block of the plurality of sequential blocks from a hash of a previous unique encryption key associated with a previous block of the plurality of sequential blocks and the data of the previous block of the plurality of sequential blocks, encrypting, with a standard encryption coder, the current block of the plurality of sequential blocks by associated unique strong encryption key, merging the encrypted blocks into a resultant bit stream, and starting with a fixed block size for the first block in a plurality of sequential blocks, varying the block size for all subsequent blocks of the plurality of sequential blocks based on a unit value at a current mask position or retaining the block size as constant.

DETAILED DESCRIPTION

Figure 1A:
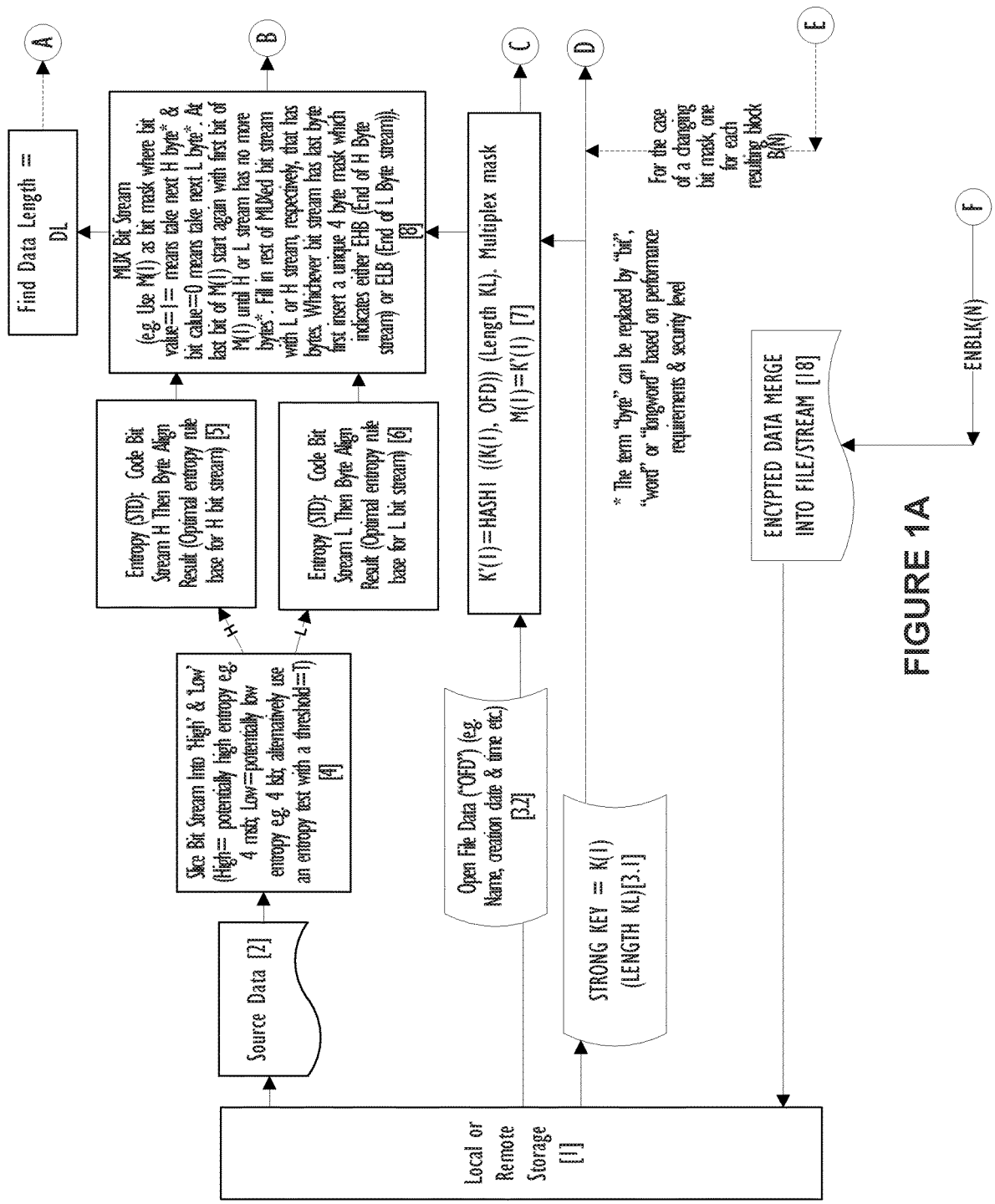
FIGS. 1A-1B are flow diagrams illustrating the process by which the bit stream is allocated to an entropy band, multiplexed, block-sliced and encrypted based on any entropy and encryption standard algorithm in accordance with at least one embodiment.

In at least one embodiment, there is provided a method for creating a pre-process to any symmetric encryption process based on an initial single strong crypto key. This method can be used with any existing or future encryption standard as well as any existing or future entropy compression standard.

The following process elements described herein are well within the instruction sets of current processing chips.

In at least one embodiment, the present invention provides a method of creating a streamed symmetric encryption process based on an initial, strong crypto key, any existing or future encryption standard as well as any existing or future entropy compression standard.

The first step of this embodiment of the process is the two-stage generation of two keys based on the strong crypto key as a seed and known information from the bit stream. The second step of this embodiment of the process is to split the bit stream into at least one high entropy (for example, high nibble) and one low entropy (for example, low nibble) bit stream and the combination of which define the whole bit stream. High nibble (also known by the alternate spelling "nybble") and low nibble will be understood as, respectively, the four most significant digits and the four least significant digits within a byte as will be readily appreciated by the skilled person.

Each of these bit streams can be separately byte aligned and are then, separately and in parallel, entropy compressed. After entropy coding, the two byte aligned streams can be multiplexed using one of the initial crypto keys as a cyclic multiplexing bit mask with, for example, a '0' denoting insertion of a low aligned byte and, for example, a '1' denoting insertion of a high aligned byte into the resulting bit stream. The third step in this process is to slice the resulting bit stream into equal sized blocks and, based on a different crypto key per block, to encrypt the current block and add the encrypted block to the coded output bit stream. Each new crypto key is derived from the previous crypto key value and the previous pre-encrypted bit stream data via a hash. As will be readily understood by the appropriately skilled person, the decoding process is a simplified inverse of the encoding process.

In another embodiment, it is contemplated that the present invention provides a method of defining at least two high and low entropy bit streams based on a thresholding process. In another embodiment the multiplexing unit may multiplex either a bit, a nibble, a word or a longword instead of a byte and in yet another embodiment the bit mask may be changed based on each new crypto key derived and incremented at increments of a bit or up to the multiplexing unit size.

In another embodiment the block size can be cyclically modulated by a look-up table in accordance to the Strong Key bit or nibble value with a last bit offset.

The following definitions will be used throughout the following specification:

(1) Definitions

Bit Mask (also referred to as "bit mask"): a sequential list of bits which are the entries of a binary number.

Block: one or more group of bytes that function as the smallest encryption data unit.

Cipher Text: the resulting data after an encryption process which uses a cipher (also known as a crypto key) and an encryption process on Plain Text, i.e. the Source Data.

Crypto Key: a series of bits used within a cryptographic algorithm, an encryption process, to transform Plain Text into Cipher Text or inversely Cipher Text into Plain Text.

Data Owner (also referred to as the "DO"): The person or persons, service or services, which define the party that possesses Digital Data for storage or sharing, as will be discussed in further detail below. It is contemplated that the Data Owner can be an asset use, originator or owner.

Digital Data (also referred to as the "DD"): Any digital information, such as but not limited to, a username plus password combination, software code, data files, digital media such as a photo, music, video, a document, text, notes, binary string, among any other digital information that will be readily understood by the skilled person.

Encrypted Block (also referred to as "ENBLK"): Is the resulting block after encryption by the algorithm ENCRYPT{K"(n); B(n)} where K"(n) is the $n^{th}$ crypto key to be used to encrypt the $n^{th}$ block B(n).

Encryption Key: for the purposes of the present invention can be considered analogous to the Crypto Key.

Encryption symmetric key: A random-character bit string used with a symmetric encryption algorithm (in these embodiments, the 'Cipher' or crypto key) and which is generated and securely held by a Data Owner.

Hash 1 operator HASH1{K(1); OFD}: the operator HASH1 is some standard hash operator that operates on the strong key K(1) (or other crypto key K"(n)) of length KL and on the selected Open File Data OFD to produce a unique multiplexing/de-multiplexing bit mask M(1) (or variable multiplexing/demultiplexing bit mask M(n)) and the intermediate encryption key K'(1), of length KL. This same hash process can be used to generate M(n) of length KL from K"(n−1) the actual n−$1^{th}$ encryption key and OFD.

Hash 2 operator HASH2{D1; D2}: the operator HASH2 is some standard hash operator that operates on data:

(1) D1, which initially is the strong key K and then the previous block B(n−1), and (2) D2, which initially is the first intermediate encryption key K' and thereafter the previous actual encryption key K" each of length KL, to produce a unique new encryption key associated with one and only one block, i.e. the $n^{th}$ crypto key, K"(n) of length KL associated with block B(n).

High Bit Stream: a bit stream which is anticipated to have a higher entropy content (the high entropy band) than another bit stream.

Index Value (also referred to as "index value"): the value of the index 'i' of any scalar, vector, list or matrix Vi which is an element of the same or larger vector, list or matrix Indexed Value (also referred to as "indexed value"): the value of any scalar, vector, list or matrix Vi which is an element of the same or larger vector, list or matrix and which can be incremented by the index value 'i'.

Key Length (also referred to as the "KL"): the length in bits of any crypto key.

Low Bit Stream: a bit stream which is anticipated to have a lower entropy content (the low entropy band) than another bit stream.

Open File Data: any data associated with a data file which is readable from a file and which is not encrypted during any encryption process.

Slice Bit Stream: to separate a bit stream into two or more bit streams whose contents are mutually exclusive, not redundant and when combined form the whole bit stream.

Strong Key: the well protected encryption key initially supplied by the system.

Source Data: the Digital Data which a Data Owner desires to retain as secret or communicate securely.

Threshold (also referred to as the "T"): an integer value between 0 and 15 determined ahead of time, e.g., amongst others, by the entropy calculation of a block, indicating the bits belonging to the high bit stream band in any byte, word or longword, as the case may be.

Vi or V(i): any variable V that can be indexed from 1 to some maximum integer value. The index integer here is represented by "i" but the characters j, k, l, m or n are also used below. The variable can be any capital letter(s).

In at least one embodiment, the present invention provides a novel end-to-end encryption method for Digital Data sharing through a Third Party, as will be described hereinafter. Although the invention is described in terms of specific illustrative embodiment(s), it is to be understood that the embodiment(s) described herein are by way of example only and that the scope of the invention is not intended to be limited thereby.

(2) Example

Figure 1B:
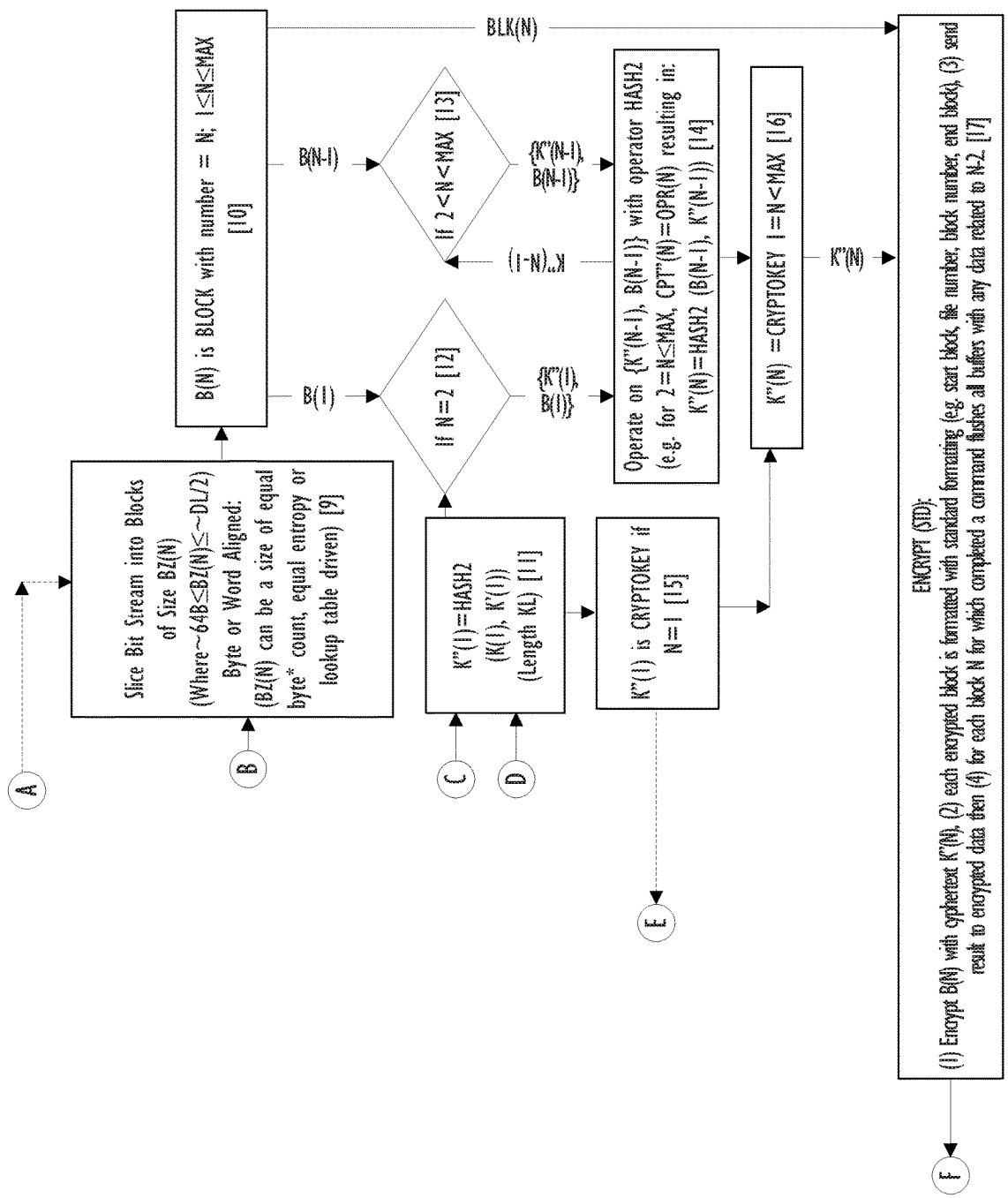

With reference to FIGS. 1A-1B, at least one embodiment of the present invention is illustrated in which Source Data [2], a Strong Key K(1) [3.1] and Open File Data [3.2] are obtained from either local or remote storage [1] and encrypted.

The Source Data [2] is sliced into two bit streams, a High ("H") band and a Low ("L") band each of which forms a separate bit stream, whereby one has a higher entropy content according to a thresholding rule T (e.g. the four most significant bits per byte or high nibble) and the other has a lower entropy content according to T (e.g. the four least significant bits per byte or low nibble) [4]. Then, using any known standard entropy coder that will be readily apparent to the skilled person ("ENTROPY( . . . )") encode the H bit stream (i.e. ENTROPY(H)) [5] and in parallel encode the L bit stream (i.e. ENTROPY(L)) [6].

Next, this embodiment of the method proceeds to use the Strong Key K(1) [3.1] and selected Open File Data ("OFD") [3.2] under the standard hash operator HASH1 to obtain the bit multiplexing mask M(1) whereby M(1)=K'(1) [7]. Note that, in another embodiment, by using K"(n−1) (i.e. instead of K(1)) for the case of n greater than or equal to 2 along with previous mask selected data from OFD, i.e. OFD(n), one can generate a new multiplexing mask M(n) for each new block. This multiplexing mask is then used to select whether a byte (or, in another embodiment, bit, word or longword depending on the encoder settings) is taken from the H bit stream (i.e. current M(1) bit is '1') or from the L bit stream (i.e. current M(1) bit is '0'), with the mask bit entry value stepped one for each byte allocated; starting at mask bit value 0 to mask bit value equal Maximum. Once Maximum is reached start with mask bit value 0 again and the process proceeds to increment as before to multiplex the two bit streams into one bit stream [8]. If the H or L bit stream has reached the last bit therein then a unique End of High Bit stream ("EHB") flag can be set after the last bit of the H bit in the multiplexed bit stream or an unique End of Low Bit stream ("ELB") flag can be set after the last bit of the L bit in the multiplexed bit stream respectively and the remaining bit stream is filled with the remaining L or H bytes respectively. Depending on the initial settings the multiplexed bit stream can now be sliced into blocks B(n) (e.g. 256 byte-long blocks) whose size should preferably not be less than about 64 bytes (due to considerations discussed above) and not more than about half the file size ("DL") [9] with the term "about" here meaning within a factor of two and n being greater than 1 and less than or equal to the maximum number of blocks in the bit stream $N_{max}$. After slicing into blocks an End Of Block (EOB) flag is added to each block.

Next each encryption key K"(n), which is uniquely associated with a block B(n), for all valid n is produced [11-16]. For n=1 one used the hash function HASH1 to produce K'(1) and M(1)=K'(1) in [7] and the hash function HASH2 to produce the first actual encryption key K"(1) used to encrypted a B(n) as follows:

K"(1)=HASH2{K(1);K'(1)} [11] and [15] and then First In, First Out (FIFO) stored in [16].

Next, the hash function HASH2 is used as follows to produce K"(n) for 1≤n</=Nmax with [12] and [13] and then [14]:

K"(n)=HASH2{B(n-1);K"(n-1)} in [14] and then FIFO stored in [16].

Once the FIFO [16] has at least one entry the block encryption process [17] can begin. The encrypted block ENBLK(n) is produced by any standard encryption algorithm ENCRYPT as follows:

ENBLK(n)=ENCRYPT{K"(n); B(n)} [17].

After a block is encrypted, excluding the End Of Block (EOB) flag, the End Of Block (EOB) flag can be added post encryption and is part of the transferred encrypted block ENBLK(n). Once ENBLK(n) is transferred all data in buffers associated with index values less than or equal to n-2 can be flushed.

The resulting ENBLK blocks are structured in the normal fashion into a file with the same Open File Data as the Source Data file [18] and can then be sent to the system for either local or remote storage for further use [1].

Figure 2A:
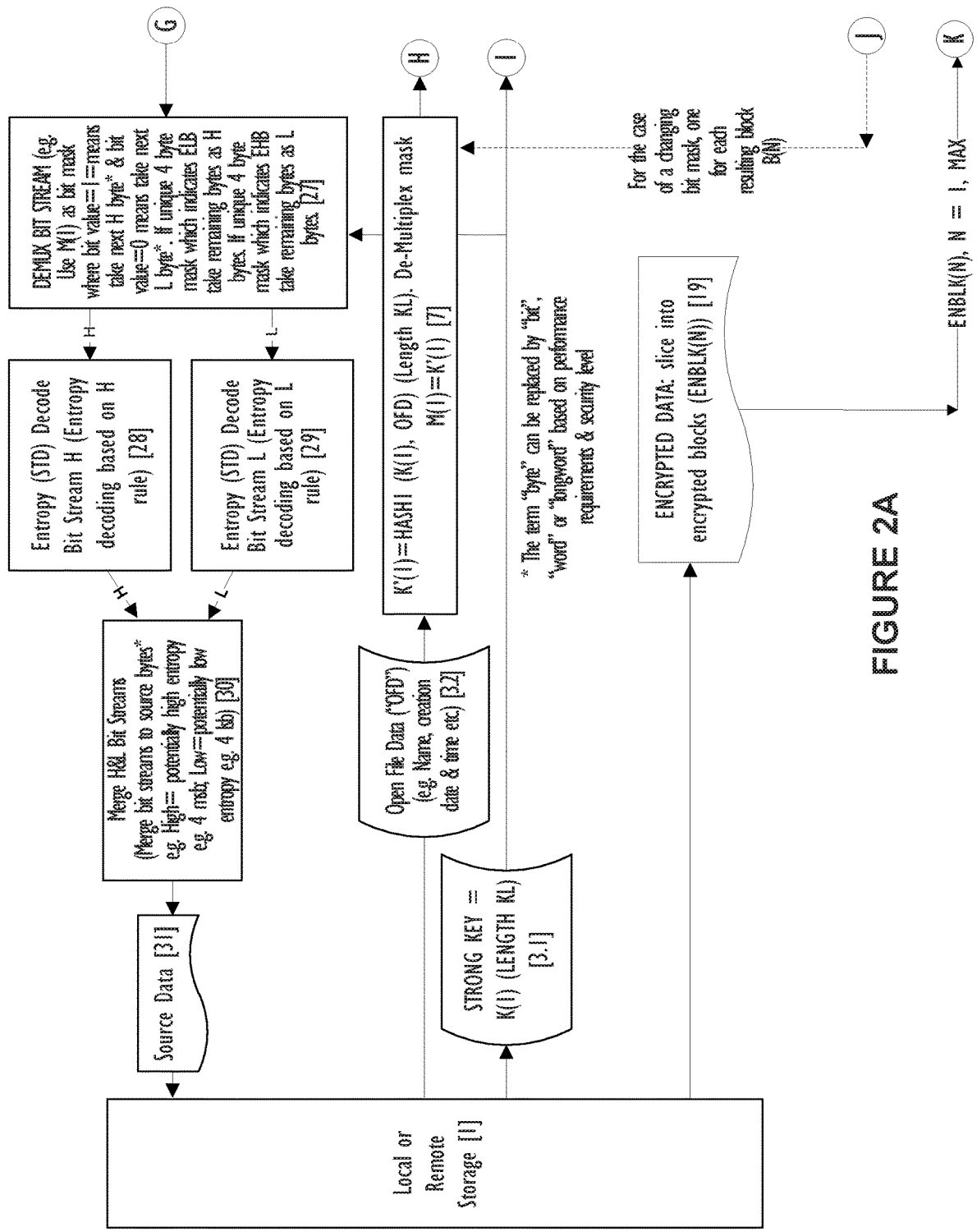
FIGS. 2A-2B are flow diagrams illustrating the process by which the encoded bit stream is decrypted, block-adjoined, de-multiplexed, entropy decoded into entropy bands and bit stream adjoined in the decryption process based on any encryption and entropy standard algorithm in accordance with at least one embodiment.
Figure 2B:
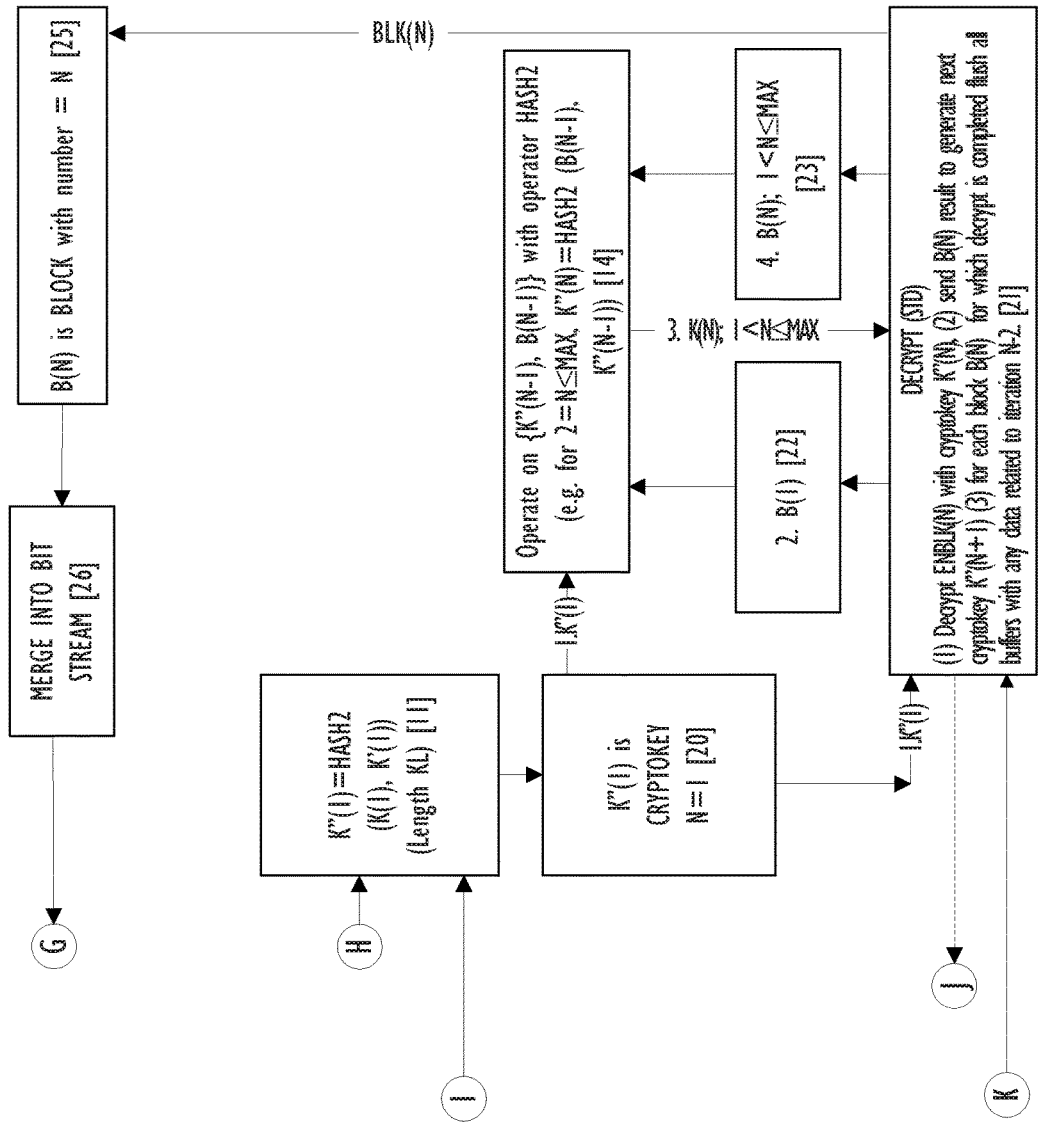

Referring to FIGS. 2A-2B which are flow diagrams illustrating at least one embodiment of the inverse of the encoding process of FIGS. 1A-1B [20-30] (in other words, the decoding process) to derive the Source Data [31]. This is done by first, from local or remote storage [1], obtaining an encoded block from the encoded bit stream ENBLK(n) [1, 19], the initial Strong Key K [3.1] and the Open File Data [3.2], the latter of which is openly available in the non-encrypted portion of the encrypted file wherein the encrypted blocks ENBLK(n) are contained.

Using the Strong Key K(1) [3.1] and the Open File Data OFD [3.2] under the hash operator HASH1 the bit mask M(1) is obtained for de-multiplexing whereby M(1)=KV [7]. The first actual decryption key K"(1) [11] for the first encrypted block ENBLK(1) is obtained via HASH2 as shown in [11], that is:

K"(1)=HASH2{K(1);K'(1)} [11]

and then is sent to [21] for the first encrypted block decryption using the standard decryption algorithm [21]. It is also sent to [14] to generate the next decryption crypto key based on HASH2 as follows:

B(1)=DECRYPT{K"(1); ENBLK(1)} [21]

K"(2)=HASH2{B(1);K"(1)} [21], [22] and [20] to [14]

which is then used for all n, with values 1≤n≤MAX, to generate subsequent crypto keys according to:

K"(n)=HASH2{B(n-1); K"(n-1)} in [14] with results from [23], the previous block B(n-1), and last crypto key K"(n-1).

The current crypto key K"(n) is used with the current encoded block ENBLK(n), excluding the End Of Block (EOB) flag, to generate the current decoded block B(n) a follows:

B(n)=DECRYPT{K"(n); ENBLK(n)} [21] whereby after decryption the End Of Block (EOB) flag is added back to B(n).

Once both the current crypto key K"(n) and block B(n) are obtained for n>2 then, except for the de-multiplexing mask, all buffers can be flushed of all data associated with decryption increment value of n-2 or less.

The current blocks are put into a FIFO [25] and, after removal of the End Of Block (EOB) flag, are merged into a byte aligned bit stream [26] which is de-multiplexed using the de-multiplexing mask M(1)=K'(1) [27]. It is contemplated that in other embodiments, the current blocks can be merged into a bit, word or longword, depending on the needs of the instant application of the embodiment.

De-multiplexing of the at least two multiplexed bit streams can then occur as follows:

(1) Select whether a bit, word or longword) is placed into the H (High) bit stream (i.e. current value of M(1) bit is '1'), associated with the High entropy band, for Entropy Decoding [28] or is placed into the L (Low) bit stream (i.e. current M(1) bit is '0'), associated with the Low entropy band, for Entropy Decoding [29].

(2) The de-multiplexing mask bit entry number is stepped by one for each byte allocated starting at de-multiplexing mask bit number 0 until the de-multiplexing mask bit reaches Maximum.

(3) Once it has reached Maximum start with de-multiplexing mask bit number 0 again etc.

(4) If the H or L bit stream has reached an end then either an End of High Bit stream ("EHB") flag is found after the last H bit in the multiplexed bit stream or an End of Low Bit stream ("ELB") flag is found after the last L bit in the multiplexed bit stream respectively and, then, the remaining bit stream is sent L or H Entropy Decoder respectively.

Note that for an embodiment where the multiplexing mask was varied upon encoding then one uses K"(n-1), for the case of n greater than or equal to 2, along with OFD(n-1) to generate each new de-multiplexing mask M(n) for each new block via HASH1. Here K"(n-1) replaces K(1) in [7]. Also, once both the current crypto key K"(n) and block B(n) are obtained for n>2 then all buffers can be flushed of all data associated with decryption and de-multiplexing increment value of n-2 or less.

Once the H and L bit streams are entropy decoded and each placed in a FIFO then they are merged by inversing the thresholding rule T; for example, each four H bits become the most significant bits in one and the same data byte and each four L bits become the least significant bits in one and the same data byte [30]. The merged bit stream is delivered to Source Data [31] and transferred to local or remote storage [1] for further use.

In other embodiments, another rule may be used in place of thresholding rule T; for example, the bit number in each byte or word depending on a buffered entropy test.

Numerous modifications could be made to any of the embodiments described above without departing from the scope of the present invention. Further, it is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. An apparatus to decode an encoded bit stream, the apparatus comprising:
   at least one processor; and
   memory including instructions that, when executed by the at least one processor, cause the at least one processor to:
   decrypt a first block of a plurality of sequential blocks using a first decryption key, the first decryption key generated based on a first hash of a second decryption key and bit stream data, the first decryption key associated with the first block of the plurality of sequential blocks to generate a first segment of a band entropy coded bit stream;
   generate a third decryption key for a second block of the plurality of sequential blocks based on a second hash of the first decryption key and data of the first block of the plurality of sequential blocks;

decrypt the second block of the plurality of sequential blocks using the third decryption key associated with the second block of the plurality of sequential blocks to generate a second segment of the band entropy coded bit stream;

merge at least the first segment and the second segment of the band entropy coded bit stream to generate a source data bit stream using a bit mask for de-multiplexing, the bit mask based on the first hash of the second decryption key and the bit stream data; and at least one of store or share the source data bit stream in a same file format as the encoded bit stream.

2. The apparatus of claim 1, wherein the instructions are to cause the at least one processor to obtain the plurality of sequential blocks by slicing the encoded bit stream into the plurality of sequential blocks.

3. The apparatus of claim 1, wherein the instructions are to cause the at least one processor to merge the first and second segments of the band entropy coded bit stream using byte alignment to generate the source data bit stream as a byte aligned source data bit stream.

4. The apparatus of claim 1, wherein the first block of the plurality of sequential blocks has a predetermined block size, and the plurality of sequential blocks includes subsequent blocks of varying block sizes.

5. The apparatus of claim 1, wherein the instructions are to cause the at least one processor to decrypt the first block of the plurality of sequential blocks and decrypt the second block of the plurality of sequential blocks using a standard decryption decoder.

6. The apparatus of claim 1, wherein the second decryption key is a strong key obtained from at least one of local storage or remote storage.

7. A storage device or storage disk comprising instructions that, when executed by at least one processor, cause the at least one processor to at least:

decrypt a first block of a plurality of sequential blocks using a first decryption key, the first decryption key generated based on a first hash of a second decryption key and bit stream data, the first decryption key associated with the first block of the plurality of sequential blocks to generate a first segment of a band entropy coded bit stream;

generate a third decryption key for a second block of the plurality of sequential blocks based on a second hash of the first decryption key and data of the first block of the plurality of sequential blocks;

decrypt the second block of the plurality of sequential blocks using the third decryption key associated with the second block of the plurality of sequential blocks to generate a second segment of the band entropy coded bit stream;

merge at least the first segment and the second segment of the band entropy coded bit stream to generate a source data bit stream using a bit mask for de-multiplexing, the bit mask based on the first hash of the second decryption key and the bit stream data; and at least one of store or share the source data bit stream in a same file format as an encoded bit stream.

8. The storage device or storage disk of claim 7, wherein the instructions, when executed by the at least one processor, cause the at least one processor to obtain the plurality of sequential blocks by slicing the encoded bit stream into the plurality of sequential blocks.

9. The storage device or storage disk of claim 7, wherein the instructions, when executed by the at least one processor, cause the at least one processor to merge the first and second segments of the band entropy coded bit stream using byte alignment to generate the source data bit stream as a byte aligned source data bit stream.

10. The storage device or storage disk of claim 7, wherein the first block of the plurality of sequential blocks has a predetermined block size, and the plurality of sequential blocks includes subsequent blocks of varying block sizes.

11. The storage device or storage disk of claim 7, wherein the instructions, when executed by the at least one processor, cause the at least one processor to decrypt the first block of the plurality of sequential blocks and decrypt the second block of the plurality of sequential blocks using a standard decryption decoder.

12. The storage device or storage disk of claim 7, wherein the second decryption key is a strong key obtained from at least one of local storage or remote storage.

13. A method to decode an encoded bit stream, the method comprising:

decrypting a first block of a plurality of sequential blocks using a first decryption key, the first decryption key generated based on a first hash of a second decryption key and bit stream data, the first decryption key associated with the first block of the plurality of sequential blocks to generate a first segment of a band entropy coded bit stream;

generating a third decryption key for a second block of the plurality of sequential blocks based on a second hash of the first decryption key and data of the first block of the plurality of sequential blocks;

decrypting the second block of the plurality of sequential blocks using the third decryption key associated with the second block of the plurality of sequential blocks to generate a second segment of the band entropy coded bit stream;

merging at least the first segment and the second segment of the band entropy coded bit stream to generate a source data bit stream using a bit mask for de-multiplexing, the bit mask based on the first hash of the second decryption key and the bit stream data; and at least one of storing or sharing the source data bit stream in a same file format as the encoded bit stream.

14. The method of claim 13, further including obtaining the plurality of sequential blocks by slicing the encoded bit stream into the plurality of sequential blocks.

15. The method of claim 13, wherein the merging of the first and second segments of the band entropy coded bit stream is based on byte alignment to generate the source data bit stream as a byte aligned source data bit stream.

16. The method of claim 13, wherein the first block of the plurality of sequential blocks has a predetermined block size, and the plurality of sequential blocks includes subsequent blocks of varying block sizes.

17. The method of claim 13, wherein the decrypting of the first block of the plurality of sequential blocks and the decrypting of the second block of the plurality of sequential blocks include using a standard decryption decoder.

18. The method of claim 13, wherein the second decryption key is a strong key obtained from at least one of local storage or remote storage.

* * * * *